US012544462B2

(12) United States Patent
Yap et al.

(10) Patent No.: US 12,544,462 B2
(45) Date of Patent: Feb. 10, 2026

(54) COMPOSITE HIGH-BRIGHTNESS FLUOROPHORES WITH CONTROLLABLE SPECTRA SHAPES AND METHOD OF USING COMPOSITE HIGHBRIGHTNESS FLUOROPHORES

(71) Applicant: Michigan Technological University, Houghton, MI (US)

(72) Inventors: Yoke Khin Yap, Houghton, MI (US); Dongyan Zhang, Houghton, MI (US); Nazmiye Yapici, South Lyon, MI (US); Xiuling Liu, Ann Arbor, MI (US)

(*) Notice: Subject to any disclaimer, the term of this patent is extended or adjusted under 35 U.S.C. 154(b) by 969 days.

(21) Appl. No.: 17/765,310

(22) PCT Filed: Sep. 30, 2020

(86) PCT No.: PCT/US2020/053500
§ 371 (c)(1),
(2) Date: Mar. 30, 2022

(87) PCT Pub. No.: WO2021/067411
PCT Pub. Date: Apr. 8, 2021

(65) Prior Publication Data
US 2022/0370643 A1    Nov. 24, 2022

Related U.S. Application Data

(63) Continuation-in-part of application No. 17/615,441, filed as application No. PCT/US2020/035574 on Jun. 1, 2020, which is a continuation-in-part of application No. 17/615,425, filed as application No. PCT/US2020/035568 on Jun. 1, 2020, which is a continuation-in-part of application No. 15/953,200, filed on Apr. 13, 2018.

(60) Provisional application No. 62/855,128, filed on May 31, 2019, provisional application No. 62/855,121, filed on May 31, 2019, provisional application No. 62/908,023, filed on Sep. 30, 2019, provisional application No. 62/485,379, filed on Apr. 13, 2017.

(51) Int. Cl.
*A61K 49/00*    (2006.01)
*G01N 33/533*   (2006.01)
*G01N 33/543*   (2006.01)
*B82Y 30/00*    (2011.01)

(52) U.S. Cl.
CPC ....... *A61K 49/0054* (2013.01); *G01N 33/533* (2013.01); *G01N 33/54353* (2013.01); *B82Y 30/00* (2013.01)

(58) Field of Classification Search
CPC .. A61B 5/0071; A61K 49/00; A61K 49/0054; A61K 49/0059; B82Y 5/00
See application file for complete search history.

(56) References Cited

U.S. PATENT DOCUMENTS

2010/0069606 A1* 3/2010 Bangera ............ A61K 47/6901
977/734
2018/0296705 A1   10/2018 Yap

FOREIGN PATENT DOCUMENTS

WO    2013043902    3/2013

OTHER PUBLICATIONS

Huang et al (Carbon nanotube-based multicolor fluorescent peptide probes for highly sensitive multiplex detection of cancer-related proteases, Journal of Material Chemistry B, 1, 3470-3476, 2013 (Year: 2013).*
International Search Report and Written Opinion for International Patent Application No. PCT/US2020/053500 dated Dec. 15, 2020.
He et al., "Multiplexed photoluminescent sensors: towards improved disease diagnostics", Chemical Society Reviews, vol. 46, No. 22, pp. 6687-6696. 2017.
Zhou et al., "Surface antigen profiling of colorectal cancer using antibody microarrays with fluorescence mutiplexing", Journal of Immunological Methods, vol. 355, No. 1-2, pp. 40-51. Apr. 2010.
Huang et al., "Carbon nanotube-based multicolor fluorescent peptide probes for highly sensitive multiplex detection of cancer-related proteases", Journal of Materials Chemistry B, vol 1, No. 28, pp. 3470. 2013.
Hoffmann et al., "Nanoparticle-encapsulated vis- and NIR-emissive fluorophores with different fluorescence decay kinetics for lifetime multiplexing", Coresta PTM Technical Report, vol. 406, No. 14, pp. 3315-3322. Jan. 16, 2014.
International Preliminary Report on Patentability for International Patent Application No. PCT/US2020/053500 dated Apr. 14, 2022.
Chen et al., "Using Aptamer-Conjugated Fluorescence Resonance Energy Transfer Nanoparticles for Multiplexed Cancer Cell monitoring," Anal Chem. ;81(16):7009-14, published Aug. 15, 2009.

* cited by examiner

*Primary Examiner* — Micah Paul Young

(57) ABSTRACT

A compound includes a first linker having a first end connected to the carrier, a second linker having a first end connected to the carrier, a third linker having a first end connected to the carrier, a first fluorescent entity connected to a second end of the first linker, a second fluorescent entity different from the first fluorescent entity connected to a second end of the second linker, and a biomolecule connected to a second end of the third linker. The biomolecule is configured to connect to a biomarker. A method of detecting biomarkers is also disclosed.

20 Claims, 8 Drawing Sheets

COMPOSITE HIGH-BRIGHTNESS FLUOROPHORES WITH CONTROLLABLE SPECTRA SHAPES AND METHOD OF USING COMPOSITE HIGHBRIGHTNESS FLUOROPHORES

CROSS-REFERENCE TO RELATED APPLICATIONS

This application claims priority to U.S. Provisional Application Ser. No. 62/908,023 filed Sep. 30, 2019, International Application No. PCT/US2020/035568, filed Jun. 1, 2020, and International Application No. PCT/US2020/035574, filed Jun. 1, 2020. U.S. Provisional Application Ser. No. 62/908,023, International Application No. PCT/US2020/035568, and International Application No. PCT/US2020/035574, are hereby incorporated by reference herein in their entireties.

STATEMENT OF GOVERNMENT SUPPORT

The inventions described herein were made with government support under Grant #1261910, Grant #1521057 and Grant #1738466 awarded by the National Science Foundation. The Government has certain rights in this invention.

BACKGROUND

Fluorophores are compounds with fluorescent properties that have biomedical applications. For example, fluorophores can be used as tracers or dyes for staining certain molecules or structures. More particularly, fluorophores can be used to stain tissues, cells, or biological materials in a variety of analytical methods, such as fluorescent imaging and spectroscopy.

Flow cytometry (FCM) can count and sort thousands of cells per second and can be used for phenotyping biomarkers. For such applications, each type of biomarker is specifically tagged with a fluorophore. By tagging specific biomarkers, the population of specific biomarkers can be quantified by quantifying the fluorescence signals from the specific fluorescent entity that is tagged on the biomarkers. Conventional FCM uses band pass filters to serially isolate and detect signals only near the peak of the fluorescence wavelength ranges of each fluorescent entity. Spectral flow cytometry (Spectral FCM) collects a continuous fluorescence spectrum from one or more fluorophores across the entire detection window by using a series of many detectors. Therefore, spectral FCM can also distinguish signals by the shapes of the fluorescence spectra.

SUMMARY

A compound according to an exemplary embodiment of this disclosure, among other possible things includes a first linker having a first end connected to the carrier, a second linker having a first end connected to the carrier, a third linker having a first end connected to the carrier, a first fluorescent entity connected to a second end of the first linker, a second fluorescent entity different from the first fluorescent entity connected to a second end of the second linker, and a biomolecule connected to a second end of the third linker. The biomolecule is configured to connect to a biomarker.

In a further example of the foregoing, the carrier is a boron nitride nanotube (BNNT) or carbon nanotube (CNT).

In a further example of any of the foregoing, the carrier is a nanodot.

In a further example of any of the foregoing, the first end of at least one of the first, second, and third linkers is covalently bonded to the carrier.

In a further example of any of the foregoing, the first end of at least one of the first, second, and third linkers includes a functional group, and the functional group covalently bonds the linker to the carrier.

In a further example of any of the foregoing, the second end of at least one of the first, second, and third linkers is covalently bonded to one of the first and second fluorescent entities or the biomolecule via a functional group.

In a further example of any of the foregoing, the first end of at least one of the first, second, and third linkers is non-covalently bonded to the carrier.

In a further example of the foregoing, at least one of the first, second, and third linkers is amphiphilic, and includes a hydrophobic region and a hydrophilic region. The hydrophobic region is non-covalently bonded to the carrier.

In a further example of any of the foregoing, at least one of the first, second, and third linkers has a molecular weight between about 1000 and 10000 Da.

In a further example of any of the foregoing, the carrier is a boron nitride nanotube.

In a further example of any of the foregoing, at least one of the at least one of the first, second, and third linkers is DSPE-PEGn (1,2-distearoyl-sn-glycero-3-phosphoethanolamine-N-[(polyethylene glycol)n]), where n is a number of polyethylene glycol (PEG) molecules in a PEG chain.

A method of detecting biomarkers according to an exemplary embodiment of this disclosure, among other possible things includes providing a plurality of fluorophores to a sample, each of the plurality of fluorophores including a biomolecule, a first fluorescent entity, and a second fluorescent entity linked to a carrier. The biomolecule is configured to interact with a plurality of biomarkers in the sample. The biomolecule is configured to interact with a plurality of biomarkers in the sample. The method also includes exciting the plurality of fluorophores in the sample with a laser and detecting at least one of an identity and a quantity of the plurality of biomarkers in the sample based on a fluorescence spectra emitted by the excited plurality of fluorophores.

In a further example of any of the foregoing, the first and second fluorescent entities and the biomolecule are linked to the carrier by first, second, and third linkers. At least one of the first, second, and third linkers is linked to the carrier via a covalent bond.

In a further example of any of the foregoing, wherein the first and second fluorescent entities and the biomolecule are linked to the carrier by first, second, and third linkers, respectively. At least one of the first, second, and third linkers is linked to the carrier via a non-covalent bond.

In a further example of any of the foregoing, at least one of the first, second, and third linkers is amphiphilic, and includes a hydrophobic region and a hydrophilic region. The hydrophobic region is non-covalently bonded to the carrier.

In a further example of any of the foregoing, at least one of the first, second, and third linkers has a molecular weight between about 1000 and 10000 Da.

In a further example of any of the foregoing, the carrier is a boron nitride nanotube.

In a further example of any of the foregoing, the plurality of fluorophores is a first plurality of fluorophores, the biomarker is a first biomarker, and the biomolecule is a second biomolecule, and further comprising providing a second plurality of fluorophores to a sample, each of the second plurality of fluorophores including a second biomolecule, a third fluorescent entity, and a fourth fluorescent entity linked to a carrier. The second biomolecule is configured to interact with a second plurality of biomarkers in the sample. The second fluorophore connects to the second biomolecule.

In a further example of any of the foregoing, the second plurality of fluorophores are excited by the laser, and further comprising detecting at least one of an identity and a quantity of the second plurality of biomarkers in the sample based on a fluorescence spectra emitted by the excited second plurality of fluorophores.

DETAILED DESCRIPTION

Very generally, high-brightness fluorophores contain a carrier element, a fluorescent element, and a linker linking the carrier element to the fluorescent element. For biomedical applications, each of the carrier element, the linker, and the fluorescent element must be biocompatible (though the requirements for biocompatibility will vary with the particular application).

One example carrier element is a nanomaterial, such as carbon nanotubes (CNT) and boron nitride nanotubes (BNNTs), both of which are recognized as biologically compatible nanomaterials for biomedical applications such as cellular drug delivery and spectroscopy applications. However, it has been shown that fluorescent elements linked to nanotubes exhibit quenching, or a reduction in the brightness of the fluorescence.

It has been discovered that certain fluorophores having nanomaterial carriers not only do not exhibit the quenching effect, but also that exhibit brightness several orders of magnitude higher than other known fluorophores, as has been described in U.S. patent application Ser. No. 15/953, 200, filed Apr. 13, 2018, and published as U.S. Patent Pub. No. 2018/0296705; International Application No. PCT/US2020/035568, filed Jun. 1, 2020; and International Application No. PCT/US2020/035574. U.S. patent application Ser. No. 15/953,200, International Application Nos. PCT/

US2020/035568, and PCT/US2020/035574 are hereby incorporated by reference herein in their entireties.

Figure 1A:
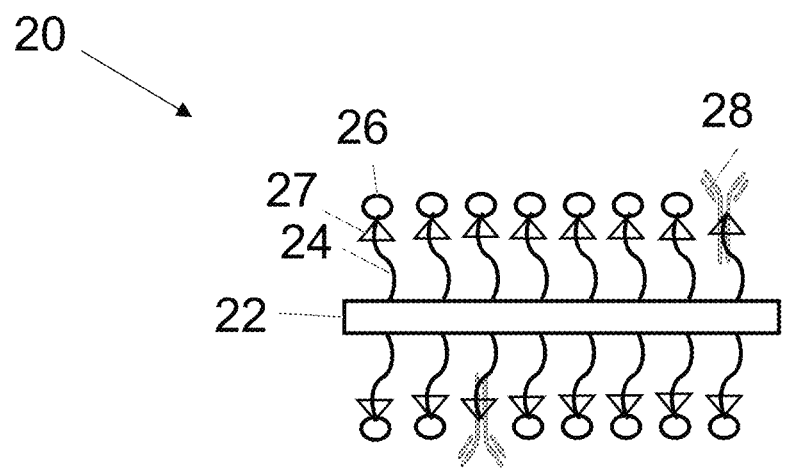
FIG. 1A schematically shows antibody-conjugated high-brightness fluorophore structures.

Referring now to FIG. 1A, fluorophores 20 are schematically shown. Fluorophores 20 generally comprise an inorganic or organic nano-scale carrier 22, a linker 24, a fluorescent entity 26, as well a biomolecule 28 (such as an antibody). The antibodies/biomolecules 28 can be selected to interact with biomarkers, including those on the cell walls, extracellular vesicles (such as exosomes), etc. Example biomarkers include surface markers such as CD9, CD127 as well as intra cellular markers, etc. This interaction connects the fluorophore 20 to the biomarkers so that the biomarker can be detected (and counted, identified, etc.) by detection of the shape of the fluorescence spectra of fluorophore 20, as discussed in more detail below.

The carrier 22 is, in one example, a boron nitride nanotube (BNNT) or carbon nanotube (CNT) carrier. The carrier 22 can be fabricated by any known method.

In a particular example, the carrier 22 is a multi-walled BNNT or CNT carrier, where each BNNT or CNT has multiple co-axial shells of hexagonal boron nitride (h-BN for BNNTs) or graphene (for CNTs), with a typical external diameter of more than about 1 nm but less than about 80 nm. The length of these BNNTs and CNTs is between about 1-5000 nm. In other examples, the carrier 22 can be another nano-scale inorganic material, such as boron nitride (h-BN) nanosheets/nanoparticles and graphene/graphite nanosheets/nanoparticles. Boron nitride nanodots and carbon nanodots are also contemplated. In one example, as is more fully described in International Application No. PCT/US2020/035574, the nanodots are processed by mechanical agitation to encourage the formation of imperfections in the nanostructure of the dots, which imperfections encourage/enable bonding to linkers 24, which in turn enables more linkers 24 and thus more fluorescent entities 26 to bond to the nanodot and improve fluorescence of the resulting fluorophore 20.

Figure 1B:
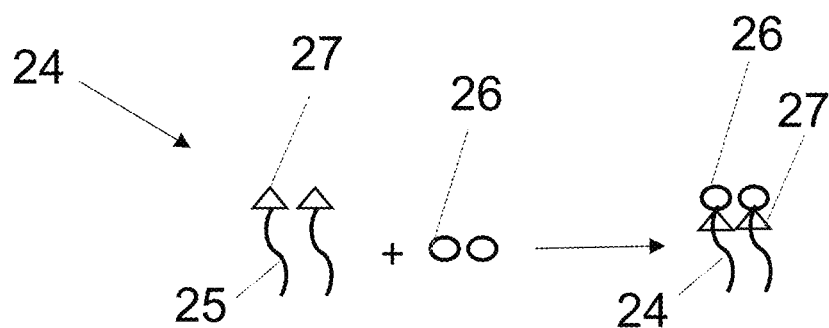
FIG. 1B schematically shows dye-linker structures.

Referring now to FIG. 1B, the linker 24 is in one example an amphiphilic polymeric linker. That is, the linker 24 includes a hydrophobic region 25 and a hydrophilic region 27. The hydrophobic region 25 non-covalently bonds to the nanotube carrier 22, while the functional group on hydrophilic region 27 is covalently bonded to the fluorescent entity 26 (or another entity, as will be discussed below). One example linker 24 is DSPE-PEG$_n$-NH$_2$ (1,2-distearoyl-sn-glycero-3-phosphoethanolamine-N-[amino(polyethylene glycol)$_n$]), where n is a number of polyethylene glycol (PEG) molecules in a PEG chain. Other linkers 24 can similarly include a PEG chain (or a different chain) which varies in length.

Figure 1C:
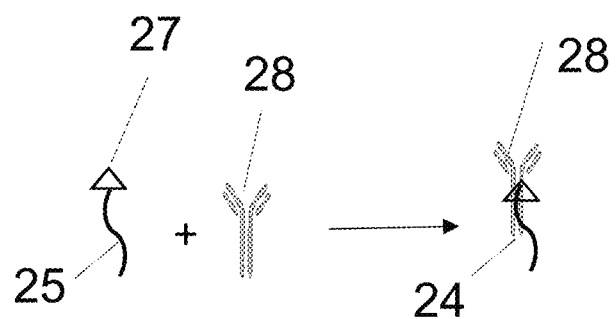
FIG. 1C schematically shows antibody-linker structures.

Referring now to FIG. 1C, the hydrophobic region 25 non-covalently bonds to the nanotube carrier 22, while functional group on the hydrophilic region 27 is covalently bonded to the antibody 28 (or another biomolecule, such as nucleus acids, etc). One example linker 24 is DSPE-PEG$_n$-Maleimide (1,2-distearoyl-sn-glycero-3-phosphoethanolamine-N-[maleimide(polyethylene glycol)$_n$]), where n is a number of polyethylene glycol (PEG) molecules in a PEG chain. Other linkers 24 can similarly include a PEG chain (or a different chain) which varies in length and can have various functional groups.

In one example, as is more fully described in patent application Ser. No. 15/953,200, the linker 24 has a molecular weight of greater than about 1000 Da (which corresponds to a stretched linker length of about 5-10 nm for a linker 24 with a PEG chain) and less than about 10000 Da, which allows for improved fluorescence of the resulting fluorophores 20 as compared to prior art fluorophores. In a further example, the linker 24 molecular weight is greater than about 2400 Da and less than about 10000 Da.

In addition to the DSPE-PEG linkers 24 discussed above, many other potential linkers are known in the art. For example, a linker 24 may comprise one or more groups selected from —CH2—, —CH═, —C≡, —NH—, —N═, O—, —NH2—, —N3—, —S—, —C(O)—, —C(O)2—, —C(S)—, —S(O)—, —S(O)2—, or any combination thereof. It will be appreciated that a linker comprising more than one of the above groups will be selected such that the linker 24 is stable; for example, a linker 24 may not include two adjacent —O— groups, which would generate an unstable peroxide linkage. The linker 24 may be a straight chain, a branched chain, or may include one or more ring systems. Non-limiting exemplary linkers include a hydrophobic area which can be fatty acids, phospholipids, sphingolipids, phosphosphingolipids [such as DSPE, 1-O-hexadecanyl-2-O-(9Z-octadecenyl)-sn-glycero-3-phospho-(1'-rac-glycerol) (ammonium salt), N-octanoyl-sphingosine-1-{succinyl[methoxy(polyethylene glycol)5000, D-erythro-sphingosyl phosphoethanolamine, 1,2-diphytanoyl-sn-glycero-3-phospho-L-serine, 3-sn-phosphatidyl-L-serine (PS), glycosylphosphatidylinositol,1,2-dioleoyl-sn-glycero-3-phosphoethanoamine but not limited). The hydrophobic unit can be used to conjugate with water soluble polymeric chains such as PEG (or PEO polyethyleneoxide), PMO (poly methyl oxazoline), PEI (polyethyleneimine), polyvinyl alcohol, polyvinylpyrolidone, polyacrylamide, polypeptide, carbohydrate anchors. The water soluble polymeric chains are attached to the linkers at one end, and attached to the fluorescent entity (or another moiety, as discussed below) at a second end. These hydrophobic and hydrophilic units must have reactive groups as mentioned above and such that the groups conjugate together into amphiphilic linkers.

In another example, as is more fully described in International Application No. PCT/US2020/035574, fluorophores 20 can be created by covalent functionalization of the linkers 24 onto the carrier 22. In this example, the linker 24 includes a functional group "R" that interacts with the carrier 22 and a functional group "R'" that interacts with other moieties that are attached to the carrier 22, like the fluorescent dye molecules 26 and the antibodies 28. This linker 24 in this example is not necessarily amphiphilic (and may or may not have hydrophobic/hydrophilic regions 25/27), though it could be. Further, in some examples, multiple linkers 24 could be attached to one another in series. An example functional group is an azide group, though any known functional group is contemplated. In further examples described in International Application No. PCT/US2020/035574, the carriers 22 are processed such as by mechanical agitation in polar liquid in order to form imperfections in the nanostructure of the carriers 22, which imperfections encourage/enable bonding to linkers 24 via functional groups R.

The fluorescent entity 26 is any know fluorescent dye, including but not limited to coumarins, benzoxadiazoles, acridones, acridines, bisbenzimides, indole, benzoisoquinoline, naphthalene, anthracene, xanthene, pyrene, porphyrin, fluorescein, rhodamine, boron-dipyrromethene (BODIPY) and cyanine derivatives. Many such fluorescent dyes are commercially available. The fluorescent entity 26 is bonded to the linker 24 by any appropriate method.

Figure 2:
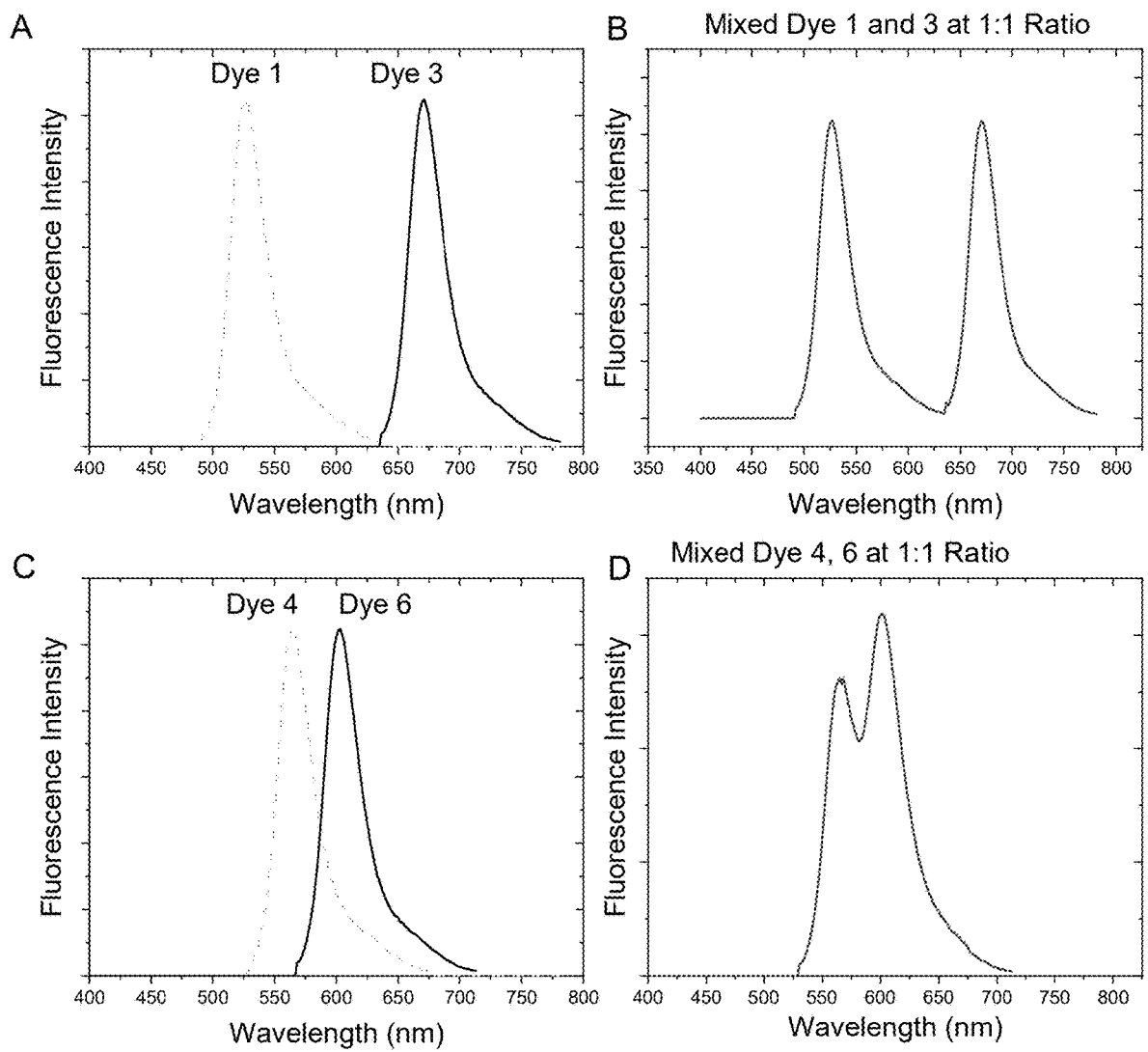
FIG. 2A shows simulated fluorescence signals from dye 1 and dye 3 emit at the same fluorescence intensities.
FIG. 2B shows simulated fluorescence signals from composite fluorophores consist of dye 1 and dye 3.
FIG. 2C shows simulated fluorescence signals from dye 4 and dye 6 emit at the same fluorescence intensities.
FIG. 2D shows simulated fluorescence signals from composite fluorophores consist of dye 4 and dye 6.

Any of the high brightness fluorophores 20 ("HFBs") described herein can include more than one type of fluorescent entity 26 on each carrier 22 to create a "composite fluorophore." For example, FIG. 2A shows fluorescence spectra for two example fluorescent dyes 26, "dye 1" and "dye 3." The dyes have similar emission spectra as fluorescein isothiocyanate (FITC), and Cyanine-5 (Cy5), with peak emissions at ~515 nm, and 665 nm, respectively.

In the case where "dye 1" and "dye 3" emit at a same fluorescent intensity (a ratio of 1:1), the fluorescence spectra of composite fluorophores 20 having these dyes will be as shown in FIG. 2B with two peaks.

In another example, a composite fluorophore 20 includes two other example dyes, "dye 4" and "dye 6", with different fluorescence spectra from the example above, and relatively narrower spacing between spectra peaks as compared to the example above, as shown in FIG. 2C. In this example, "dye 4" and "dye 6" simulate the emission spectra of Alexa 555 and Alexa 568, with peak emissions at ~573 nm, and 603 nm, respectively.

In the case where "dye 4" and "dye 6" emit at a same fluorescent intensity (a ratio of 1:1), the fluorescence spectra of composite fluorophores 20 consisting of these dyes will be as shown in FIG. 2D with two closer peaks as compared to those shown in FIG. 2B. The intensity of the second peak at 603 nm is higher in this case due to the spectra overlap with the tail of the adjacent spectrum (as shown in FIG. 2C).

Accordingly, it has been discovered that composite fluorophores 20 made of different types of dyes will result in fluorescence spectra with different, identifiable shapes as shown in FIGS. 2B and 2D.

Figure 3:
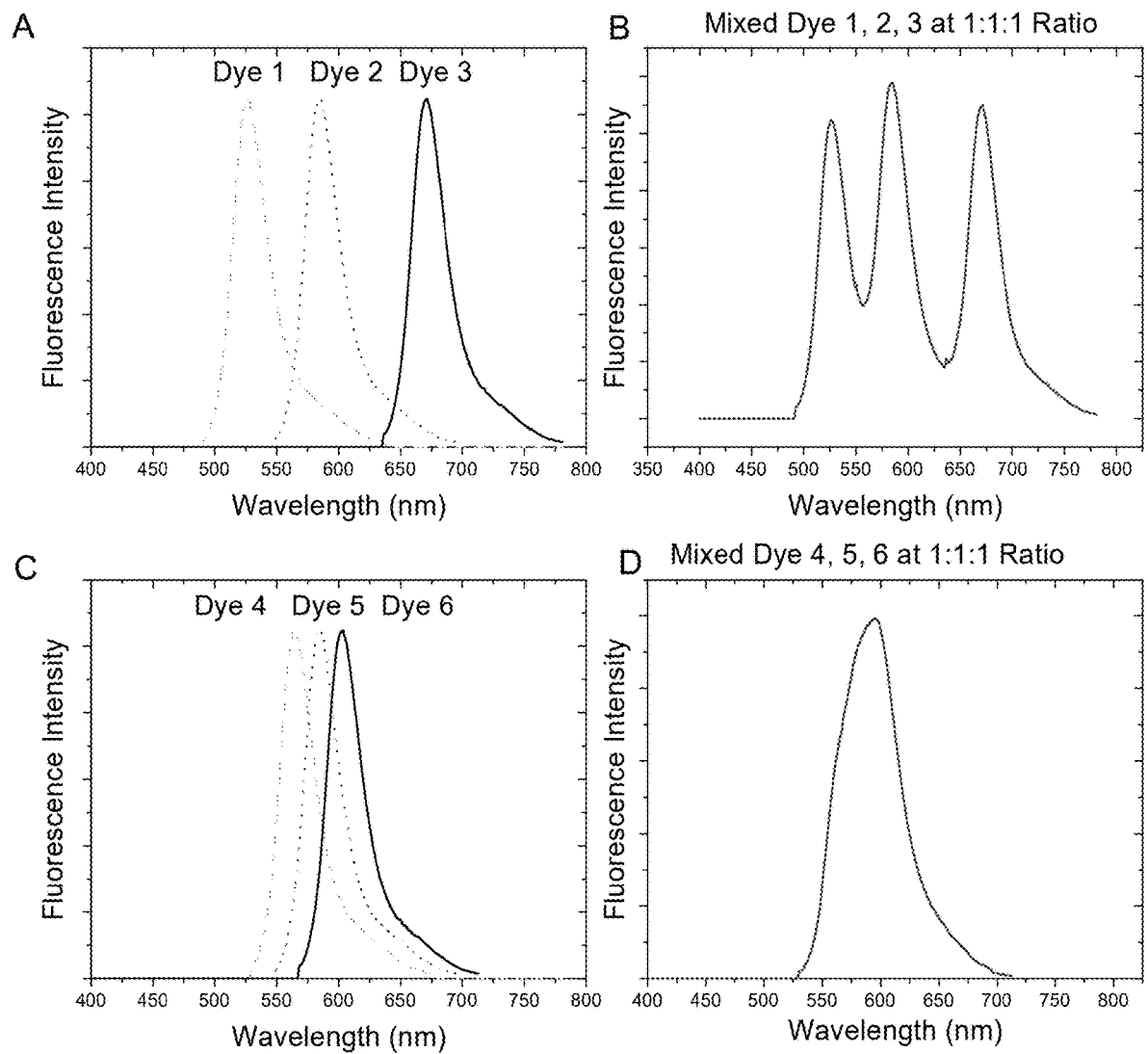
FIG. 3A shows simulated fluorescence signals from dye 1, 2, and 3 at the same fluorescence intensities.
FIG. 3B shows simulated fluorescence signals from composite fluorophores consist of dye 1, 2, and 3.
FIG. 3C shows simulated fluorescence signals from dye 4, 5, and 6 at the same fluorescence intensities.
FIG. 3D shows simulated fluorescence signals from composite fluorophores consist of dye 4, 5, and 6.

As another example, a composite fluorophore 20 can include three types of dyes 1, 2, 3 with different fluorescence spectra shown in FIG. 3A. In this example, the dyes 1, 2, 3 simulate the emission spectrum of Fluorescein isothiocyanate (FITC), Sulforhodamine B (SRD), and Cyanine-5 (Cy5), with peak emissions at ~515 nm, 588 nm, and 665 nm, respectively.

In the case where "dye 1," "dye 2," and "dye 3" emit at a same fluorescent intensity (at a ratio of 1:1:1), the fluorescence spectra of composite fluorophores 20 consisting of these dyes will be as shown in FIG. 3B with three peaks. As shown, the intensity of peak 588 nm is higher than for the individual dye 2 as shown in FIG. 3A due to the spectra overlap with the tails of adjacent spectra (FIG. 3A).

As another example, a composite fluorophore 20 can include dyes 4, 5, 6 with different fluorescence spectra and narrower spacing between spectra peaks compared to the foregoing example as shown in FIG. 3C. These dyes 4, 5, 6 are simulating the emission spectra of Alexa 555, SRD, and Alexa 568, with peak emissions at 573 nm, 585 nm, and 603 nm, respectively. The spacing between these emission peaks are about 12 nm to 18 nm.

In the case where "dye 4," "dye 5," and "dye 6" emit at a same fluorescent intensity (at a ratio of 1:1:1), the fluorescence spectra of composite fluorophores 20 consisting of these dyes will be as shown in FIG. 3D. As shown, due to the close spacing of the individual emission peaks, all three individual spectrums merged into a broad spectrum with a unique shape.

As suggested by FIGS. 3B and 3D, the choice of dyes and the spacing between their emission peaks affects the fluorescence spectra shape for a composite fluorophore 20 including the dyes.

Figure 4:
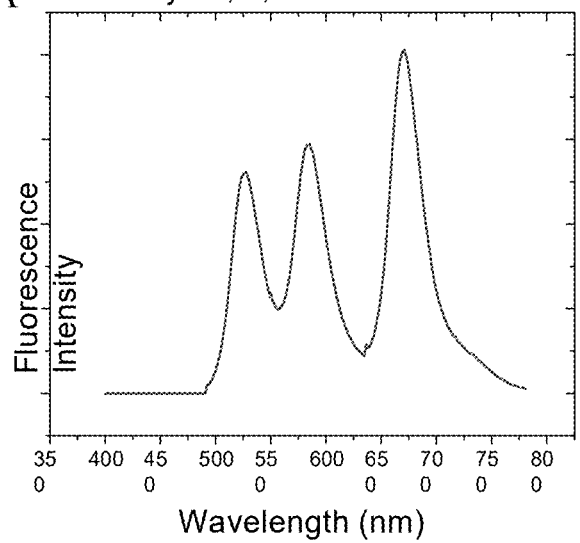
FIG. 4A shows simulated fluorescence signals from composite fluorophores consist of dye 1, 2, 3, which emit at an intensity ratio of 1:1:1.5.
FIG. 4B shows simulated fluorescence signals from composite fluorophores with dye 1, 2, 3, which emit at an intensity ratio of 1:1.5:1.
FIG. 4C shows simulated fluorescence signals from composite fluorophores with dye 1, 2, 3, which emit at an intensity ratio of 1.5:1:1.
Figure 4:
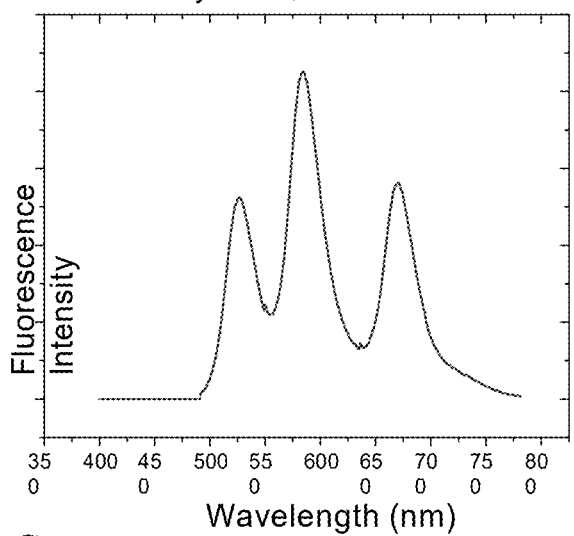
Figure 4:
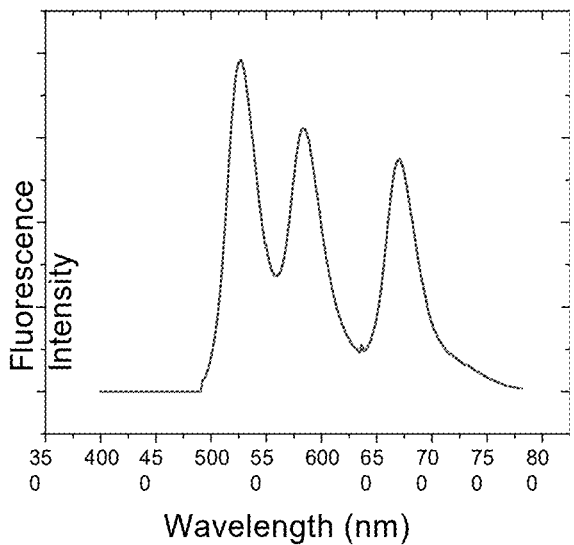

In another example, a composite fluorophore 20 can include dyes that emit at different fluorescence intensities from one another. FIG. 4A shows the merged spectra of dyes 1, 2, 3 with fluorescent intensity ratio of 1:1:1.5. FIG. 4B shows the merged spectra of dyes 1, 2, 3 with fluorescent intensity ratio of 1:1.5:1. FIG. 4C shows the merged spectra of dyes 1, 2, 3 with fluorescent intensity ratio of 1.5:1:1. As shown, all the resultant spectra are unique in shape even through these composite fluorophores 20 include the same set of dyes. The shape of the fluorescence spectra of the composite fluorophores 20 depends on the fluorescence intensity ratios of the individual dyes under certain excitation laser source/wavelength.

Figure 5:
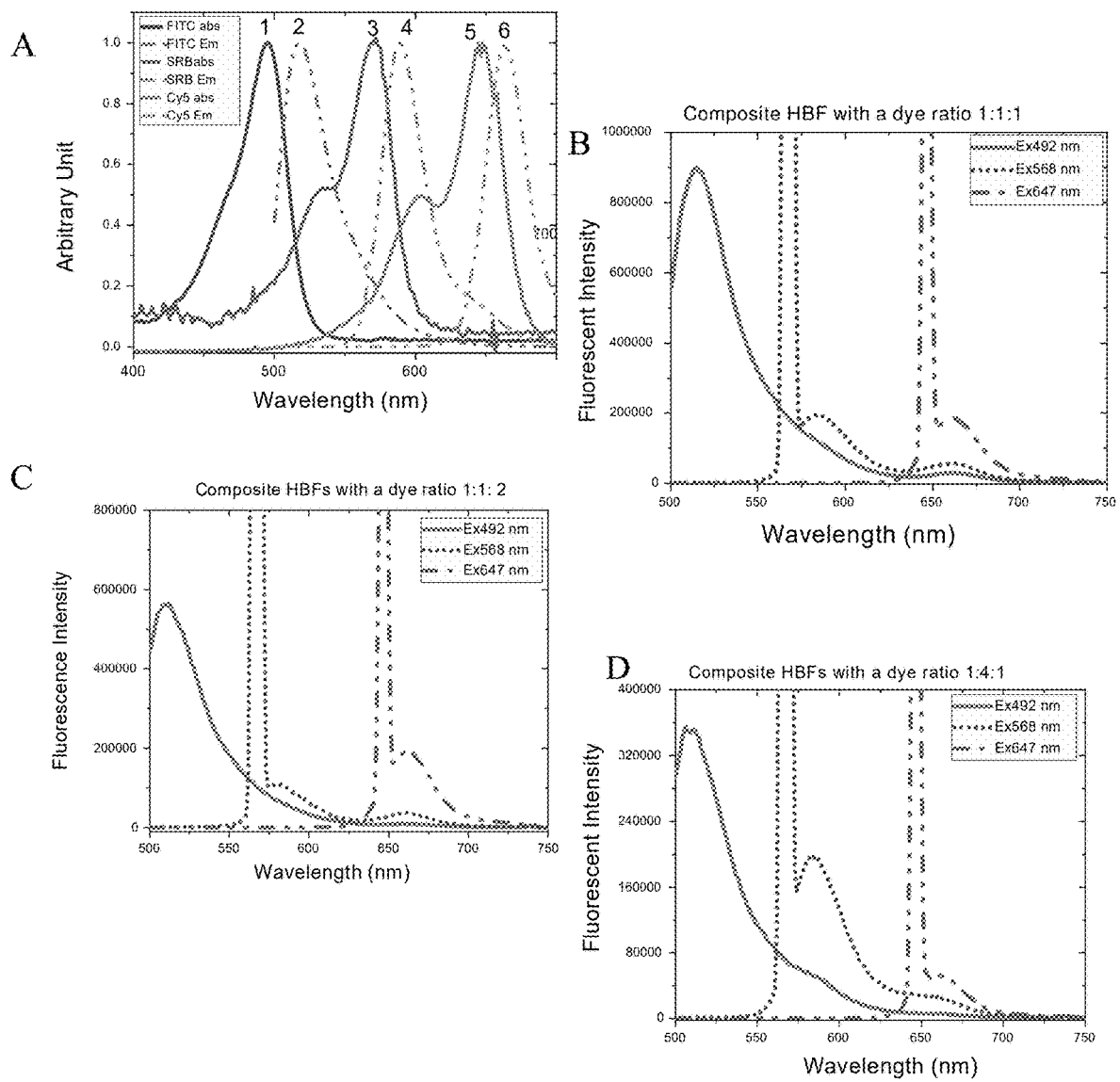
FIG. 5A shows the experimental absorption bands (solid curves) and fluorescence bands (dash curves) of FITC, SRD, and Cy5 dyes. All curves are normalized in a same scale for illustration purpose.
FIG. 5B shows fluorescence signals of composite fluorophores consist of FITC, SRD, and Cy5 dyes prepared by non-covalent functionalization at a dye-linker concentration ratio of 1:1:1. The solid, dotted, and dash curves are the actual fluorescence signals from these composite fluorophores as excited at 492 nm, 568 nm, and 647 nm.
FIG. 5C shows fluorescence signals of composite fluorophores consist of FITC, SRD, and Cy5 dyes prepared by non-covalent functionalization at a dye-linker concentration ratio of 1:1:2. The solid, dotted, and dash curves are the actual fluorescence signals from these composite fluorophores as excited at 492 nm, 568 nm, and 647 nm.
FIG. 5D shows fluorescence signals of composite fluorophores consist of FITC, SRD, and Cy5 dyes prepared by non-covalent functionalization at a dye-linker concentration ratio of 1:4:1. The solid, dotted, and dash curves are the actual fluorescence signals from these composite fluorophores as excited at 492 nm, 568 nm, and 647 nm.

FIG. 5A shows the normalized absorption bands (solid) and fluorescence bands (dash) of composite fluorophores 20 with three types of dyes 26 on each carrier 22. In this example, the carriers 22 are BNNT carriers. Spectra 1 and 2 are the absorption and fluorescence spectra of FITC, respectively. Spectra 3 and 4 are the absorption and fluorescence spectra of SRD, respectively. Spectra 5 and 6 are the absorption and fluorescence spectra of Cy5, respectively.

FIG. 5B shows the fluorescence signals of these composite fluorophores 20 as excited at 492 nm (solid), 568 nm (dot), and 647 nm (dash), respectively.

Since the laser at 492 nm is well within the absorption band of FITC (spectra 1 in FIG. 5A), strong fluorescence from FITC at 520 nm is detected as shown as the solid spectrum in FIG. 5B, with a long tail contributed by weak fluorescence of SRD (588 nm) and Cy5 (665 nm). The 492 nm laser is not supposed to result in the emission of SRD and Cy5 as the excitation laser is far away from their absorption bands (spectra 3 and 5, respectively in FIG. 5A). Therefore, the small fluorescence from SRD at 588 nm is excited by the fluorescence from FITC. Likewise, the small fluorescence from Cy5 at 665 nm is excited by the fluorescence from SRD.

The fluorescence signals of these composite fluorophores 20 as excited at 568 nm (dotted spectrum in FIG. 5B) are described as follows. The 568 nm laser excited SRD and led to strong emission at 588 nm with a weak fluorescence tail of Cy5 at 665 nm. This 568 nm laser is not supposed to excite FITC and Cy5 as the excitation laser is far away from their absorption bands. Therefore, the small fluorescence from CY5 at 665 nm is excited by the fluorescence from SRD.

The fluorescence signals of these composite fluorophores 20 as excited at 647 nm (dashed spectrum in FIG. 5B) are described as follows. The 647 nm laser only excite CY5 dye and led to strong emission at 665 nm.

As shown in FIG. 5B, the shape of fluorescence spectra of the composite fluorophores 20 are different when excited by different lasers.

FIGS. 5C and 5D summarized the effect of dye concentration used for the fabrication of composite fluorophores 20. Dye concentration is defined as the number of dye molecules per unit volume of the synthesis solution.

FIG. 5C shows the fluorescence signals of composite HBFs 20 as excited at 492 nm (solid), 568 nm (dot), and 647 nm (dash), respectively. These composite HBFs 20 are fabricated by using a mixed of FITC, SRD, and Cy5 dye molecules in a 1:1:2 concentration ratio. The total dye concentration used is the same as those described above for FIG. 5B.

FIG. 5D shows the fluorescence signals of composite HBFs 20 as excited at 492 nm (solid), 568 nm (dot), and 647 nm (dash), respectively. These composite HBFs 20 are fabricated by using a mixed of FITC, SRD, and Cy5 dye molecules in a 1:4:1 concentration ratio. The total dye concentration used is the same as those described for FIGS. 5B and 5C.

Figure 6:
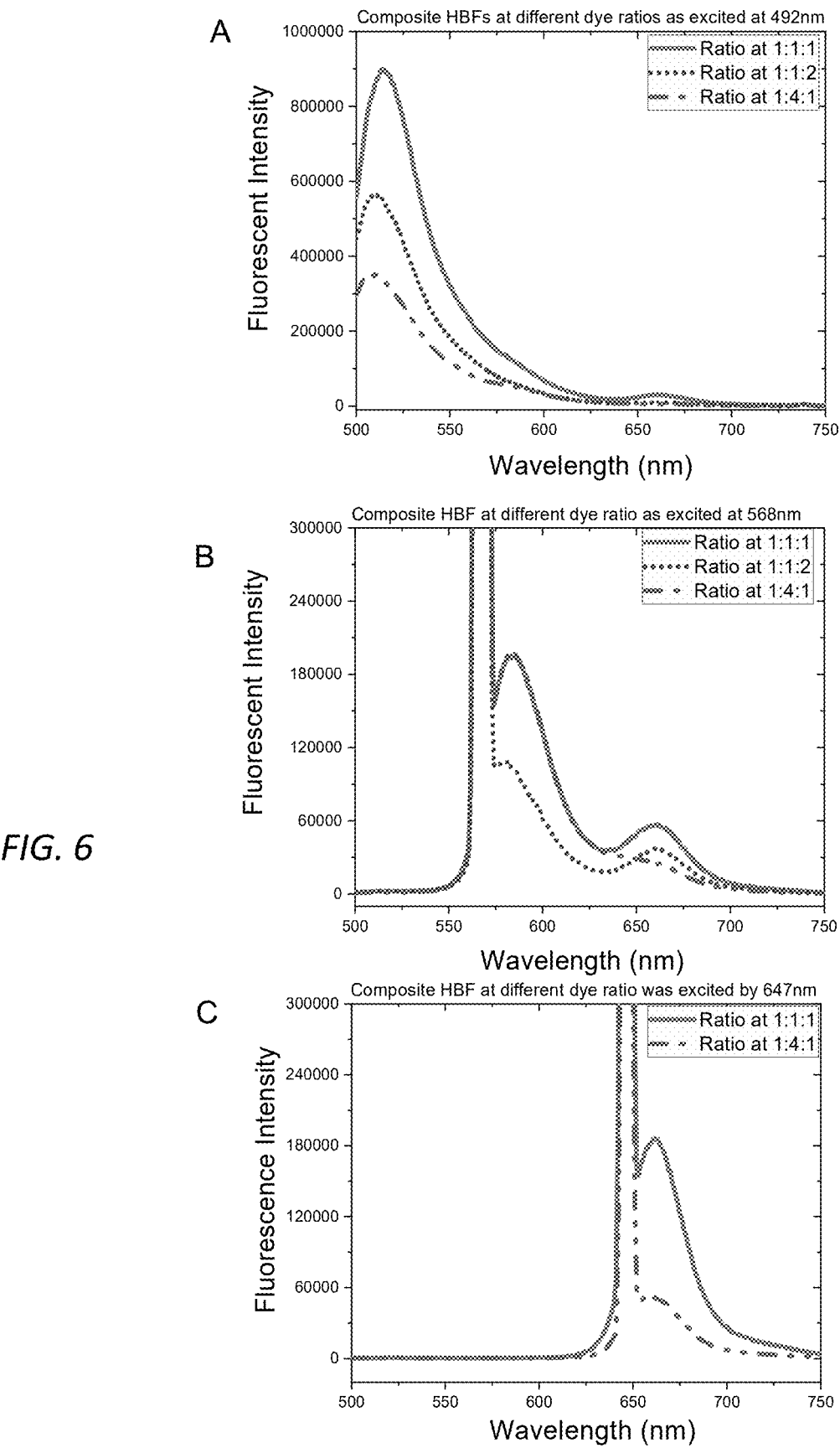
FIG. 6A compares fluorescence signals of composite fluorophores consist of FITC, SRD, and Cy5 dyes prepared by non-covalent functionalization using different dye concentration ratios. All signals are excited at 492 nm.
FIG. 6B compares fluorescence signals of composite fluorophores consist of FITC, SRD, and Cy5 dyes prepared by non-covalent functionalization using different dye concentration ratios. All signals are excited at 568 nm.
FIG. 6C compares fluorescence signals of composite fluorophores consist of FITC, SRD, and Cy5 dyes prepared by non-covalent functionalization using different dye concentration ratios. All signals are excited at 647 nm.

As shown, the solid spectra in FIGS. 5C and 5D are different in shape as excited by laser at 492 nm due to fact that these HBFs 20 have different dye concentration ratios, even though the total dye concentration is the same. For the purpose of comparison, all the spectra exited at 492 nm are shown together in FIG. 6A. As shown, composite HBFs 20 having different dye concentration ratios (1:1:1, 1:1:2, 1:4:1) but with the same total dye concentration, will emit fluorescence with different spectra shapes even when excited by the same laser wavelength. The same is true when compare all the dotted spectra (FIG. 6B as excited at 568 nm) or all the dashed spectra (FIG. 6C as excited at 647 nm).

Any of the example composite fluorophores 20 discussed above can include BNNTs as the carrier 22, and DSPE-PEG 5000 as the linkers 24, as described in U.S. patent application Ser. No. 15/953,200, filed Apr. 13, 2018, and published as U.S. Patent Pub. No. 2018/0296705.

Figure 7:
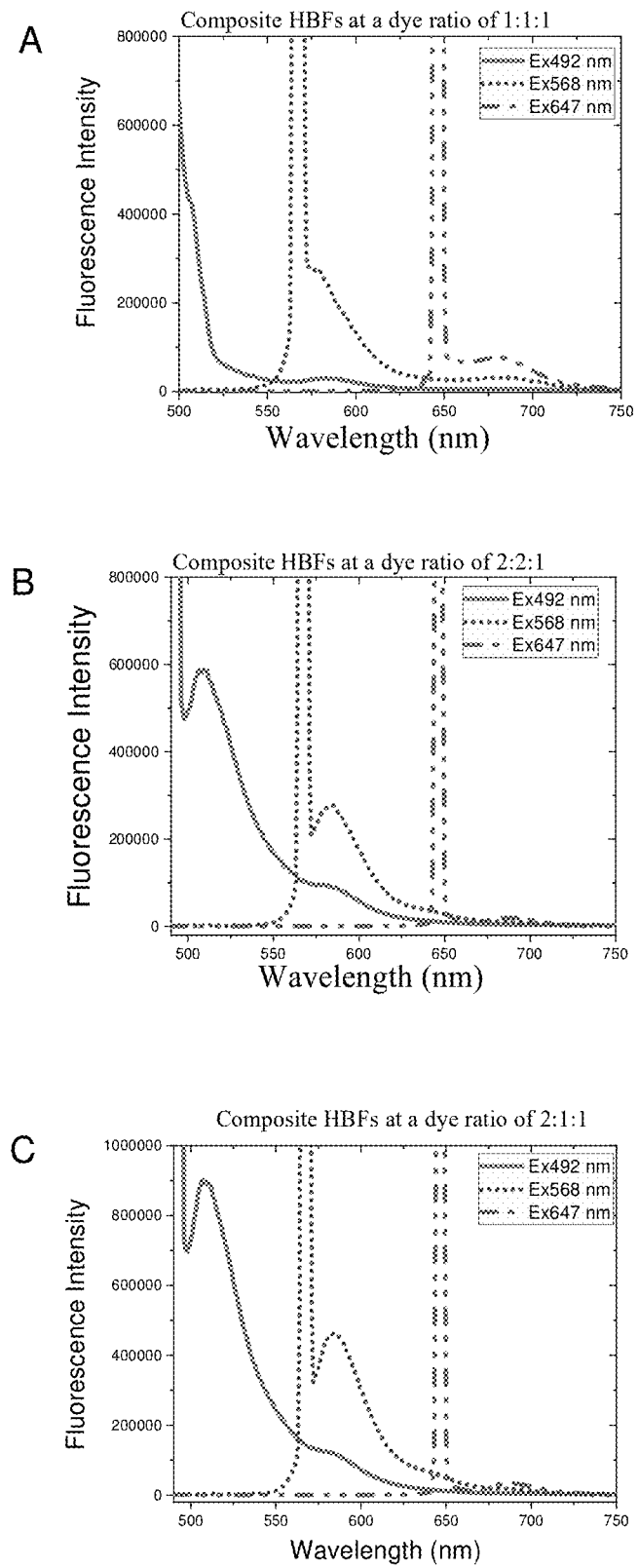
FIG. 7A shows fluorescence signals of composite fluorophores consist of FITC, SRD, and Cy5 dyes prepared by covalent functionalization at a dye-linker concentration of 1:1:1 ratio. The solid, dotted, and dash curves are actual fluorescence signals excited at 492 nm, 568 nm, and 647 nm.
FIG. 7B shows fluorescence signals of composite fluorophores consist of FITC, SRD, and Cy5 dyes prepared by covalent functionalization at a dye-linker concentration of 2:2:1 ratio. The solid, dotted, and dash curves are actual fluorescence signals excited at 492 nm, 568 nm, and 647 nm.
FIG. 7C shows fluorescence signals of composite fluorophores consist of FITC, SRD, and Cy5 dyes prepared by covalent functionalization at a dye-linker concentration of 2:1:1 ratio. The solid, dotted, and dash curves are actual fluorescence signals excited at 492 nm, 568 nm, and 647 nm.

In another example, fluorophores 20 include a linker 24 that is covalently bonded to the carrier 22 and to a fluorescent entity 26, as discussed above. These example fluorophores 20 are thus prepared by covalent functionalization. For example, fluorophore 20 includes a mixture of three different types of dyes: FITC, SRD, and Cy5 dye molecules, in three concentration ratios (1:1:1, 2:2:1, 2:1:1) as shown in FIGS. 7A, 7B, and 7C, respectively. The total dye concentration used for each these three composite HBFs 20 is the same.

As shown in FIG. 7A, the use of different excitation laser (492 nm, 568 nm, and 647 nm) will lead to different spectra shapes as illustrated by solid, dot, and dash spectra, respectively for the case of 1:1:1 dye concentration ratio.

As shown in FIG. 7B, the use of different excitation laser (492 nm, 568 and 647 nm) will lead to different spectra shapes as illustrated by solid, dot, and dash spectra, respectively for the case of dye concentration 2:2:1 ratio.

As shown in FIG. 7C, the use of different excitation laser (492 nm, 568 nm, and 647 nm) will lead to different spectra shapes illustrated by solid, dot, and dash spectra, respectively for the case of dye concentration 2:1:1 ratio.

Figure 8:
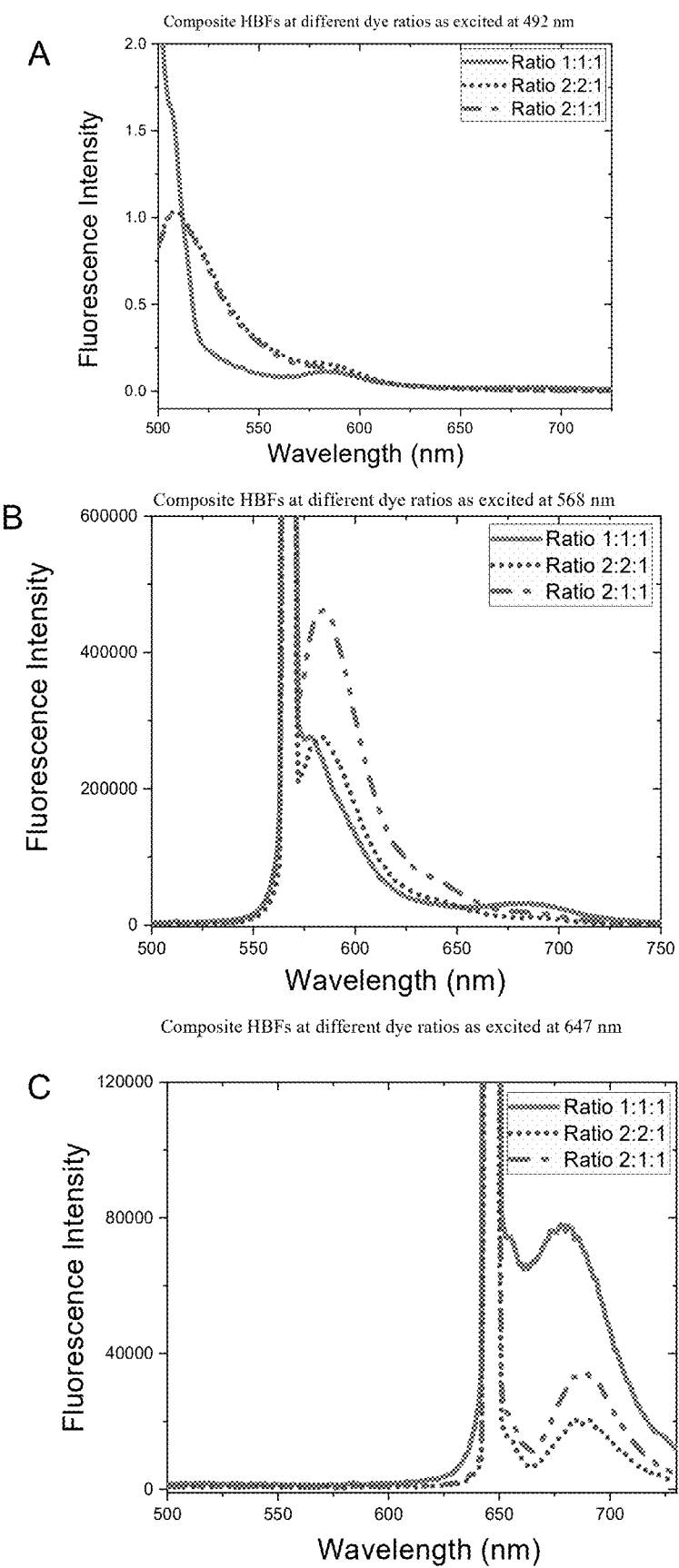
FIG. 8A compares fluorescence signals of composite fluorophores consist of FITC, SRD, and Cy5 dyes prepared by covalent functionalization using different dye concentration ratios. All signals are excited at 492 nm.
FIG. 8B compares fluorescence signals of composite fluorophores consist of FITC, SRD, and Cy5 dyes prepared by non-covalent functionalization using different dye concentration ratios. All signals are excited at 568 nm.
FIG. 8C compares fluorescence signals of composite fluorophores consist of FITC, SRD, and Cy5 dyes prepared by non-covalent functionalization using different dye concentration ratios. All signals are excited at 647 nm.

FIG. 8A compares the spectra shapes of composite fluorophores 20 prepared at 1:1:1, 2:2:1, 2:1:1 dye concentration ratios, as excited at 492 nm. As shown, the spectra shape for composite fluorophores 20 having a dye-linker 24/26 concentration ratio of 1:1:1 ratio is very different from those having a dye-linker 24/26 concentration ratio of 2:2:1 and those having a dye-linker 24/26 concentration ratio of 2:1:1 ratio. The shapes of spectra for samples having 2:2:1 and 2:1:1 ratios are similar to SRD and Cy5 dyes, individually, and are not well excited by 492 nm.

FIG. 8B compares the spectra shapes of composite fluorophores 20 having dye-linker 24/26 concentration ratios of 1:1:1, 2:2:1, and 2:1:1 as excited at 568 nm. As shown, all these spectra are different in shape.

FIG. 8C compares the spectra shapes of composite fluorophores 20 having dye-linker 24/26 concentration ratios of 1:1:1, 2:2:1, and 2:1:1, as excited at 647 nm. As shown, all these spectra are different in shape.

Accordingly, the spectra for the composite fluorophores 20 described herein vary depending on the excitation laser that is selected.

The composite fluorophores 20 described herein can be used for flow cytometry. For conventional flow cytometry (FCM), one or more biomarkers are tagged with a unique fluorophore 20, such as a composite fluorophore 20 as discussed above, via biomolecule 28 as described above. The fluorophores 20 are excited with a laser so that the fluorophores 20 fluoresce and emit detectable photons. Conventional FCM uses band pass filters to serially isolate and detect signals related to the photons only near the peak of the fluorescence wavelength ranges of each fluorescence entity. By tagging specific biomarkers, the population of those biomarkers can be quantified by quantifying the fluorescence signals from the unique fluorescent entity 20 that is tagged on the biomarker(s).

In spectral flow cytometry (spectral FCM), a fluorescence spectra for a sample is detected over a predefined detection window (e.g., range of wavelengths). The fluorescent entities 20 in the sample each have a unique fluorescence spectra which can be detected and identified as is already known in the art, e.g., by spectral unmixing, in order to identify and quantify the biomarkers in the sample.

In general, for spectral FCM, there are trade-offs between detection speed, sensitivity, and spectral resolution. For example, in order to collect many data points within a reasonable short detection duration, there would be a very short detection time for each signal. However, because the fluorophores 20 described herein have such high fluorescence intensities, less laser exposure (e.g., time) is needed to obtain a registrable fluorescence signal. Therefore, the fluorophores 20 described herein allow spectral FCM to be used in high-throughput applications. Furthermore, because the composite fluorophores 20 can include two, three, or more fluorescent entities 26 that are selected to produce a fluorophores 20 with unique fluorescence spectra when combined in various amounts, many different fluorophores 20, each with unique fluorescence spectra, can be made with readily available fluorescent dyes.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. A compound, comprising:
    a boron nitride carrier;
    a first linker having a first end connected to the carrier;
    a second linker having a first end connected to the carrier;
    a third linker having a first end connected to the carrier;
    a fourth linker having a first end connected to the carrier;
    a first fluorescent entity connected to a second end of the first linker;
    a second fluorescent entity different from the first fluorescent entity connected to a second end of the second linker;
    a third fluorescent entity different from the first and second fluorescent entities connected to a second end of the third linker, wherein a ratio of fluorescence intensities is x:y:z for the first, second, and third fluorescent entities, respectively, and further wherein at least two of x, y, and z is 1; and
    a biomolecule connected to a second end of the fourth linker, wherein the biomolecule is configured to connect to biomarker.

2. The compound of claim 1, wherein the carrier is a boron nitride nanotube (BNNT).

3. The compound of claim 1, wherein the carrier is a nanodot.

4. The compound of claim 1, wherein the first end of at least one of the first, second, third, and fourth linkers is covalently bonded to the carrier.

5. The compound of claim 4, wherein the first end of at least one of the first, second, third, and fourth linkers includes a functional group, and the functional group covalently bonds the linker to the carrier.

6. The compound of claim 4, wherein the second end of at least one of the first, second, third, and fourth linkers is covalently bonded to one of the first and second fluorescent entities or the biomolecule via a functional group.

7. The compound of claim 1, wherein the first end of at least one of the first, second, third, and fourth linkers is non-covalently bonded to the carrier.

8. The compound of claim 7, wherein at least one of the first, second, third, and fourth linkers is amphiphilic, and includes a hydrophobic region and a hydrophilic region, and wherein the hydrophobic region is non-covalently bonded to the carrier.

9. The compound of claim 7, wherein at least one of the first, second, third and fourth linkers has a molecular weight between about 1000 and 10000 Da.

10. The compound of claim 1, wherein at least one of the at least one of the first, second, third, and fourth linkers is DSPE-PEG$_n$ (1,2-distearoyl-sn-glycero-3-phosphoethanolamine-N-[(polyethylene glycol)$_n$]), where n is a number of polyethylene glycol (PEG) molecules in a PEG chain.

11. A method of detecting biomarkers, comprising:
providing a plurality of fluorophores to a sample, each of the plurality of fluorophores including a biomolecule, a first fluorescent entity, a second fluorescent entity, and a third fluorescent entity linked to a carrier, wherein the biomolecule is configured to interact with a plurality of biomarkers in the sample, and whereby the fluorophore connects to the biomolecule;
exciting the plurality of fluorophores in the sample with a laser; and
detecting at least one of an identity and a quantity of the plurality of biomarkers in the sample based on a fluorescence spectra emitted by the excited plurality of fluorophores;
wherein a ratio of fluorescence intensities is x:y:z for the first, second, and third fluorescent entities, respectively, and further wherein at least two of x, y, and z is 1.

12. The method of claim 11, wherein the carrier is a boron nitride nanotube (BNNT) carrier, or a nanodot.

13. The method of claim 11, wherein the first and second fluorescent entities and the biomolecule are linked to the carrier by first, second, third, and fourth linkers, and wherein at least one of the first, second, third, and fourth linkers is linked to the carrier via a covalent bond.

14. The method of claim 11, wherein the first, second, and third fluorescent entities and the biomolecule are linked to the carrier by first, second, third, and fourth linkers, respectively, and wherein at least one of the first, second, third, and fourth linkers is linked to the carrier via a non-covalent bond.

15. The method of claim 14, wherein at least one of the first, second, third, and fourth linkers is amphiphilic, and includes a hydrophobic region and a hydrophilic region, and wherein the hydrophobic region is non-covalently bonded to the carrier.

16. The method of claim 15, wherein at least one of the first, second, third and fourth linkers has a molecular weight between about 1000 and 10000 Da.

17. The method of claim 11, wherein the plurality of fluorophores is a first plurality of fluorophores, the biomarker is a first biomarker, and the biomolecule is a second biomolecule, and further comprising providing a second plurality of fluorophores to a sample, each of the second plurality of fluorophores including a second biomolecule, a fourth fluorescent entity, and a fifth fluorescent entity linked to a carrier, wherein the second biomolecule is configured to interact with a second plurality of biomarkers in the sample, and whereby the second fluorophore connects to the second biomolecule.

18. The method of claim 17, wherein the second plurality of fluorophores are excited by the laser, and further comprising detecting at least one of an identity and a quantity of the second plurality of biomarkers in the sample based on a fluorescence spectra emitted by the excited second plurality of fluorophores.

19. The compound of claim 1, wherein each of x, y, and z are 1.

20. The compound of claim 1, wherein two of x, y, and z are 1, and the remaining one of x, y, and z is 1.5.

* * * * *